United States Patent
Boutnaru et al.

(10) Patent No.: US 10,440,049 B2
(45) Date of Patent: Oct. 8, 2019

(54) NETWORK TRAFFIC ANALYSIS FOR MALWARE DETECTION AND PERFORMANCE REPORTING

(71) Applicant: PAYPAL, INC., San Jose, CA (US)

(72) Inventors: Shlomi Boutnaru, Modiin (IL); Eyal Ben Simon, Givat Elah (IL); Eli Strajnik, Be'er Sheva (IL); Matan Toledano, Kiryat Ata (IL)

(73) Assignee: PayPal, Inc., San Jose, CA (US)

( * ) Notice: Subject to any disclaimer, the term of this patent is extended or adjusted under 35 U.S.C. 154(b) by 186 days.

(21) Appl. No.: 15/410,256

(22) Filed: Jan. 19, 2017

(65) Prior Publication Data
US 2018/0205746 A1 Jul. 19, 2018

(51) Int. Cl.
*H04L 29/06* (2006.01)
*H04L 12/26* (2006.01)

(52) U.S. Cl.
CPC .......... *H04L 63/145* (2013.01); *H04L 43/062* (2013.01); *H04L 63/0236* (2013.01); *H04L 63/1416* (2013.01); *H04L 63/1425* (2013.01); *H04L 63/1466* (2013.01)

(58) Field of Classification Search
CPC .............. H04L 43/062; H04L 63/0236; H04L 63/1416; H04L 63/1425; H04L 63/145; H04L 69/22
See application file for complete search history.

(56) References Cited

U.S. PATENT DOCUMENTS

| | | | | |
|---|---|---|---|---|
| 9,380,462 | B1* | 6/2016 | Vivanco | H04W 12/08 |
| 2014/0013434 | A1* | 1/2014 | Ranum | H04L 63/145 |
| | | | | 726/24 |
| 2015/0372977 | A1* | 12/2015 | Yin | H04L 63/0236 |
| | | | | 726/1 |
| 2016/0127380 | A1* | 5/2016 | Steele | H04L 63/102 |
| | | | | 726/7 |
| 2016/0359879 | A1* | 12/2016 | Deen | H04L 63/1425 |

OTHER PUBLICATIONS

Unknown, Nmap (Network Mapper) [Online] [retrieved on Sep. 28, 2016]. Retrieved on the Internet: <URL: https://nmap.org/>.
Unknown, Network management, network discovery, SNMP, MIP and WMI browsers, NETBIOS and port scanner [Online] NetworkView Discovery+Monitoring [retrieved on Sep. 28, 2016]. Retrieved on the Internet: <URL: http://www.networkview.com/html/features.html>, 2000, 2001.

(Continued)

*Primary Examiner* — Edward Zee
*Assistant Examiner* — Ka Shan Choy
(74) *Attorney, Agent, or Firm* — Haynes and Boone LLP

(57) ABSTRACT

Computer networks, particularly larger networks, may have various issues and vulnerabilities. By collecting network traffic data from a network in multiple different locations, then analyzing correlations in this data, performance issues and security risks can be uncovered. Techniques disclosed herein can help mitigate risks posed by malware, mitigate network performance issues, and also help provide a detailed network map of devices, services, and/or operating systems that are present on a network.

20 Claims, 5 Drawing Sheets

(56) References Cited

OTHER PUBLICATIONS

Oluwabukola, et al., "A Packet Sniffer (PSniffer) Application for Network Security in Java" [Online] Issues in Informing Science and Information Technology [retrieved on Sep. 28, 2016]. Retrieved on the Internet: <URL: http://iisit.org/Vol10/IISITv10p389-400Oluwabukola0037.pdf>, vol. 10, 2013.

Unknown "Ethernet capture setup" [Online] The Wireshark [retrieved on Sep. 28, 2016]. Retrieved on the Internet: <URL: https://wiki.wireshark.org/CaptureSetup/Ethernet>, last edited Sep. 12, 2017 08:58:02 by Guy Harris.

Unknown "Passive Asset Detection System" [Online] Sourceforge [retrieved on Sep. 28, 2016]. Retrieved on the Internet: <URL: http://passive.sourceforge.net/about.php>.

Unknown "An Overview of Active and Passive Components used to create an IP Network" [Online] Excitingip.net [retrieved on Sep. 28, 2016]. Retrieved from the Internet: <URL: http://www.excitingip.net/53/anoverviewofactiveandpassivecomponentsusedtocreateanipnetwork>, Sep. 21, 2010.

Unknown "IDFAQ: How can passive techniques be used to audit and discover network vulnerability?" [Online] Information Security Resources [retrieved on Sep. 28, 2019]. Retrieved from the Internet: <URL: https://www.sans.org/securityresources/idfaq/howcanpassivetechniquesbeusedtoauditanddiscovernetworkvulnerability/3/15>.

Sullivan, Dan "What's on Your Network? The Need for Passive Monitoring" [Online] [retrieved on Sep. 28, 2016]. Retrieved from the Internet: <URL: http://www.tomsitpro.com/articles/network_monitoringnetflowit_securitynetworkingsnmp,25612.html>, 203-05-08, 12:55PM.

Unknown "Is it possible to tell whether two IP addresses belong to the same server" [Online] Server Fault [retrieved on Sep. 28, 2016]. Retrieved from the Internet: <URL: http://serverfault.com/questions/686461/isitpossibletotellwhethertwoipaddressesbelongtothesameserver>.

Sullivan, Dan "What's on Your Network? The Need for Passive Monitoring" [Online]. tim's IT PRO [retrieved on Sep. 28, 2016]. Retrieved from the Internet: <URL: http://www.tomsitpro.com/articles/network_monitoringnetflowit_securitynetworkingsnmp,25613.html>, May 8, 2013 12:55 PM.

Unknown "Detecting and Preventing Unauthorized Outbound Traffic" [Online] SANS Institute [retrieved on Dec. 15, 2016]. Retrieved from the Internet: <URL: https://www.sans.org/.../detection/detecting-preventing-unauthorized-outbound-traffic>, 2007.

* cited by examiner

NETWORK TRAFFIC ANALYSIS FOR MALWARE DETECTION AND PERFORMANCE REPORTING

TECHNICAL FIELD

This disclosure relates to computer systems and to computer networks. More particularly, this disclosure relates to various techniques that can be used to detect anomalies in a network, which may be indicative of a security risk, a data transmission issue, and/or a configuration issue. Techniques disclosed herein may allow detection of specific problems on a specific computing device, group of devices, network switch, data transmission link or other networking and computing equipment.

DETAILED DESCRIPTION

Figure 1:
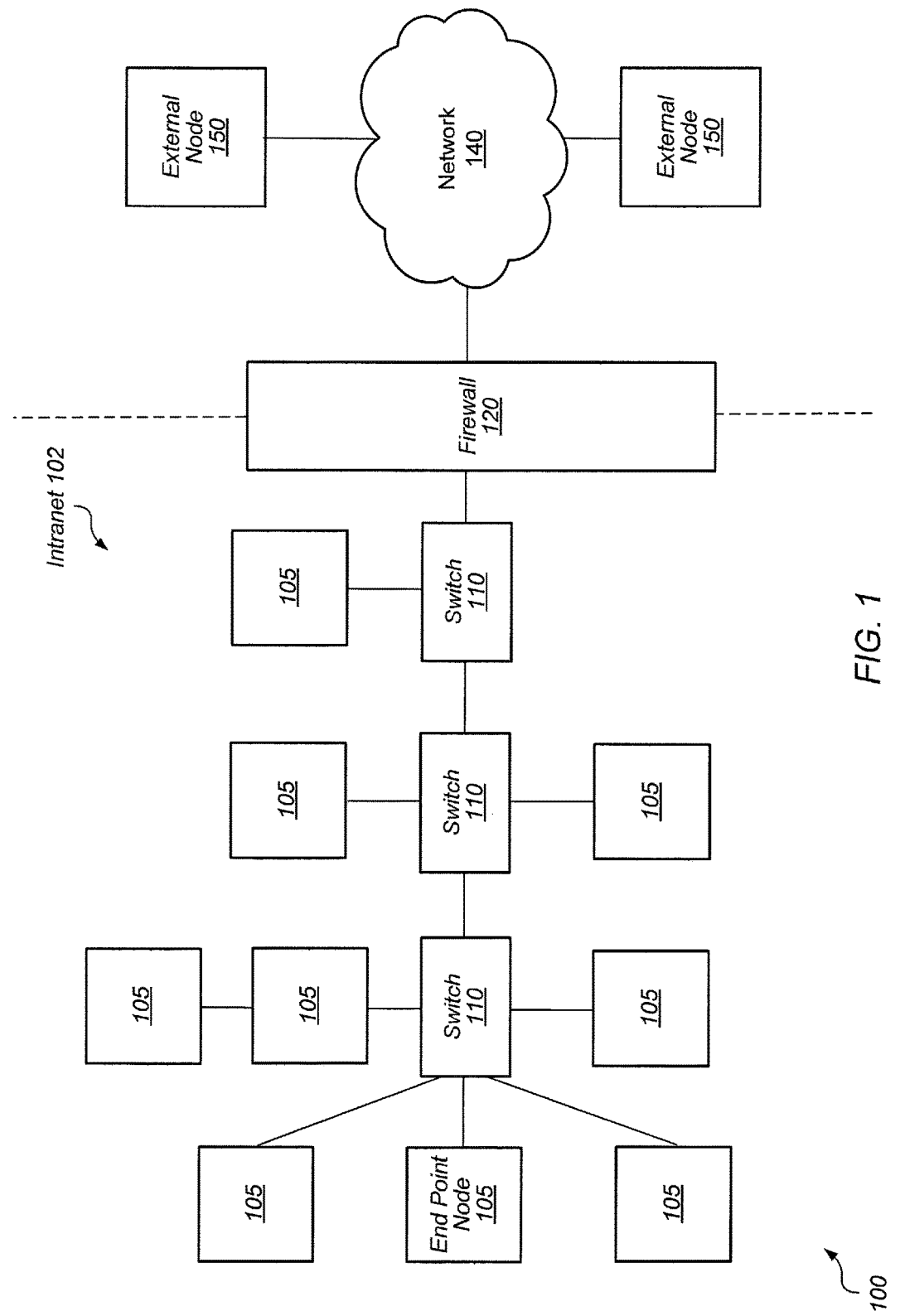
FIG. 1 illustrates a block diagram of a system that includes an intranet with various switches and endpoint nodes, connected to an outside network (e.g., the Internet) via a firewall, according to some embodiments.

Networks, particularly larger networks, may encounter a variety of technical issues. Although efforts can be made to perform monitoring at various locations (e.g., installing an antivirus system on user machines, installing network management software on networked computing equipment), such efforts are not necessarily enough to precisely determine problems affecting a system or a network.

Systems on a network may become infected by malware or otherwise infiltrated by bad actors, which can generate serious security issues. Malware infected systems may attempt to hide their network traffic by covertly avoiding a local monitoring agent. If only local data is examined, however, there may be no indication that a system has been compromised. Likewise, firewalls associated with a network may attempt to limit intrusions or illicit outbound traffic by blocking certain inbound or outbound ports. But this alone may also be insufficient to detect security issues.

By collecting network data from local endpoints as well as switches that handle traffic between different points on a network (such as a corporate intranet), however, correlations can be made between the observed network traffic at different point. By making these correlations, a deeper understanding of network-related issues can be uncovered. This may allow better understanding of security threats, for example.

Further, in some cases, a network administrator or other monitoring entity may not be aware of all devices on a network—particularly for larger networks. By examining traffic between different network nodes, however, a more complete picture of devices on a network can be formed.

Some approaches to mapping network devices may make use of active scanning, where packets are sent to different addresses or address ranges to attempt to locate devices and/or services that are running. But active scanning can be avoided in some instances. Passive scanning (e.g., observing traffic at switches or at other points along a data transfer path) can allow for a more accurate picture of a network.

Additionally, network health can be assessed using a group of endpoint agents and switch agents. Data can be collected from various points in a network that may help more accurately pinpoint whether a particular network link or network device is dropping packets, overloaded, or otherwise causing a performance problem that may impact the availability of services offered by one or more network devices. The present disclosure includes techniques and systems that can help ameliorate or eliminate the problems discussed above, in various embodiments.

Thus, in some network monitoring techniques, traffic may simply be analyzed at an edge node (e.g., a firewall to the outside Internet) to block certain types of outbound traffic. For example, packets sent from and/or to certain port numbers can be blocked. Presently disclosed techniques offer more sophistication over these approaches, however, as correlation can be performed between a network node (such as a server) and a network switch, rather than simply analyzing traffic at one point in a network like a firewall. A firewall that simply blocks certain outbound traffic, for example, will generally be unable to detect a possibly illicit connection that remains entirely within a portion of an internal network.

Also note that as used herein, the term "endpoint node" with reference to a computer network does not refer to a device that is configured to switch traffic between a first plurality of devices connected by a first plurality of distinct physical network connections and a second plurality of devices connected by a second plurality of distinct physical network connections. That is, while an endpoint node may transmit packets to or receive packets from one or more different devices, the term endpoint node does not refer to an actively configured switch.

\* \* \*

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.).

Various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

\* \* \*

Turning to FIG. 1, a block diagram of a system 100 is shown. In this diagram, system 100 includes numerous endpoint nodes 105 connected to switches 110. This conglomeration is part of an intranet 102, as shown, and can access an outside network 140 (such as the Internet) via firewall 120. External nodes 150 are connected to network 140 as shown.

In the embodiment of FIG. 1, various endpoint nodes 105 (or endpoints) may communicate with one another via switches 110 (also referred to as data switches herein). An endpoint node 105 may be a server machine that provides services to external nodes 150, or an endpoint node may be a private user machine that provides no such services, for example. Endpoint nodes 105 and switches 110 may reside on a corporate intranet, such as intranet 102, in various embodiments. External nodes 150, in the embodiment shown, can be any computing device that does not reside on intranet 102.

Network traffic from an endpoint node 105 to another endpoint node 105 or to an external node 150 may be routed through various network "hops" to reach its destination. As will be appreciated by someone with skill in the art, data packets have the potential to be lost or mishandled on each of these hops. In the event that an endpoint node 105 is communicating with an external node 150, there may be numerous internal hops on intranet 102 before a packet is passed through firewall 120. There may be further numerous hops between an outward facing communication port of firewall 120 and along network 140 (which may comprise a portion of the Internet) before a packet reaches the external node 150.

Firewall 120 may, in various embodiments, be configured to block or permit network traffic on one or more port numbers. Thus, in one embodiment, firewall 120 may allow endpoint nodes to transmit outbound traffic on ports 80 and 443 (commonly used for the HTTP and HTTPS protocols). Firewall 120 may also allow external nodes 150 to transmit to one or more endpoint nodes 105 on ports 80, 443, or other ports, in various embodiments. Firewall 120 may also selectively allow traffic in or out on certain port numbers in various embodiments.

Note that many different network configurations are possible, and techniques described herein are not limited to a network having the particular architecture shown in FIG. 1. Thus, additional endpoint nodes, data switches, firewalls, intranets, or other network features may be present even if not depicted in FIG. 1.

Figure 2:
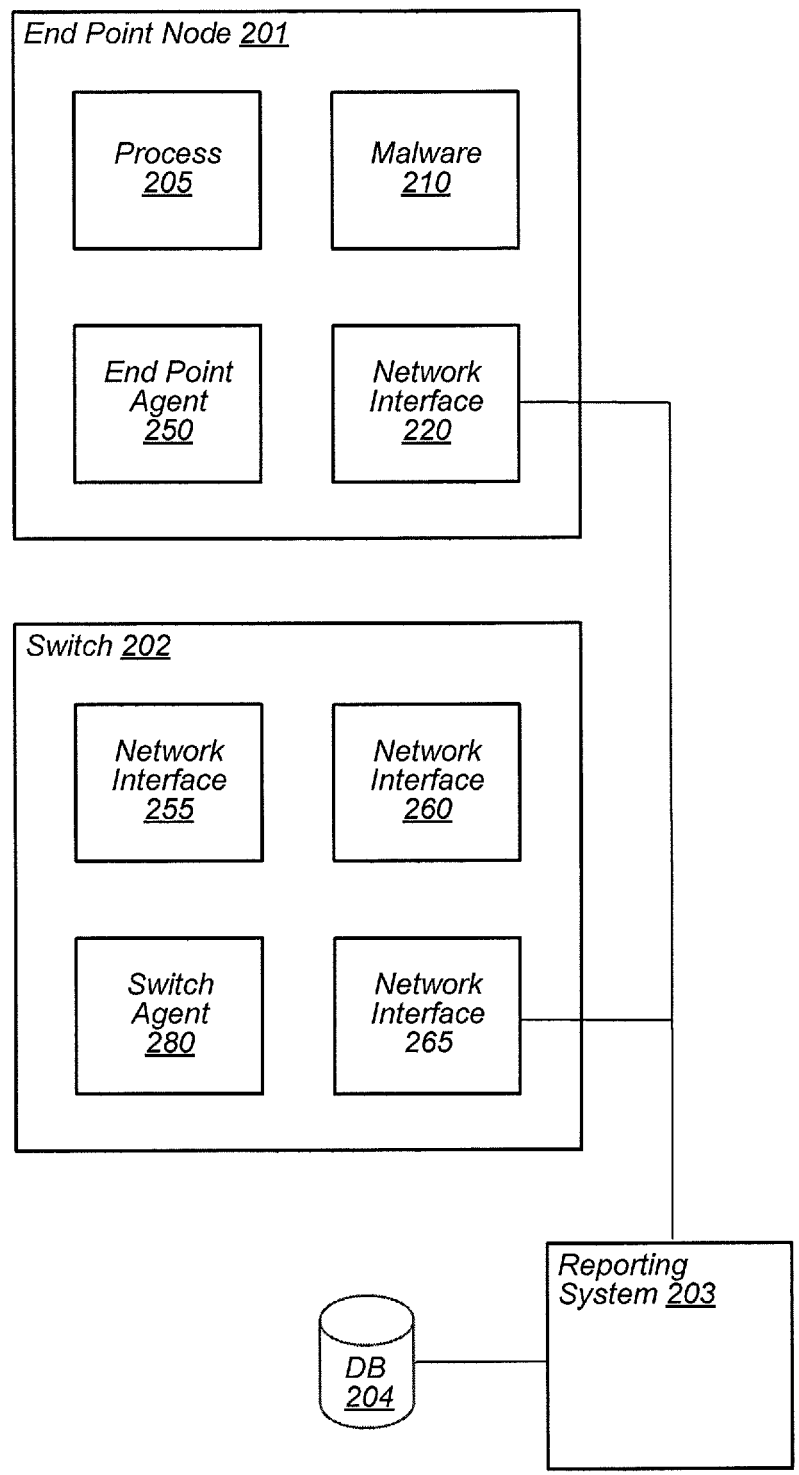
FIG. 2 illustrates a block diagram of one embodiment of a system that includes an endpoint node and a data switch.

Turning to FIG. 2, a block diagram is shown of one embodiment of a system 200 that includes endpoint node 201 and data switch 202. Endpoint node 201 may be similar or identical to any of the characteristics of endpoint nodes 105, and data switch 202 may be similar or identical to any of the characteristics of data switches 110, in various embodiments.

As shown, endpoint node 201 includes process 205, malware 210, endpoint agent 250, and network interface 220. Endpoint node 201 is connected to switch 202 via network interface 220. Switch 202 includes multiple network interfaces 255, 260, and 265, as well as switch agent 280.

In this embodiment, endpoint node 201 may execute any number of processes that may be legitimate or authorized processes. Process 205 may be server application process for processing payments, for example, or any other process.

In the embodiment shown, endpoint node 201 also includes malware 210. Malware 210 is software that was installed on endpoint node 201 without the authorization of a user or administration of the computer. This software can be one of any number of malicious or harmful types of program. As such, malware 210 may impact the performance of endpoint node 201 by using CPU, memory, or network resources, stealing data, and/or impeding functionality of other programs on the system. Malware 210 may also give remote access to endpoint node 201 to an unauthorized user (e.g., a remote bad actor). Detecting and/or mitigating malware 210 may therefore improve the functionality of endpoint node 201.

Endpoint agent 250 is a software monitor agent in the embodiment of FIG. 2, and may be used to monitor processes executing on endpoint node 201, resource usage of endpoint node 201, or other aspects of system behavior. In various embodiments, endpoint agent 250 may therefore allow various behavior of other running processes to be observed. Endpoint agent 250 may also take one or more reporting actions or remedial actions, in various embodiments.

In some embodiments, endpoint agent 250 (or another program) is configured to attempt to detect whether any malware is present on endpoint node 201. Malware 210 may be configured to avoid detection by endpoint agent 250, however. Thus, in some instances malware 210 may go undetected and unreported by endpoint agent 250.

Another function of endpoint agent 250, in various embodiments, is to gather reporting information about endpoint node 201. This reporting information may include a variety of networking information, including any and all data and/or metadata relating to packets sent or received. Thus, endpoint agent 250 may collect information including but not limited to:

- Network addresses, hostnames, or domains corresponding to systems which data was sent to or received from;
- Port numbers via which data was sent or received
- Application that opened a port via which data was sent or received (e.g., name and/or location/filepath of executable, any other data or metadata regarding application);
- Total amount of data sent or received (which can also be broken down by address/hostname/domain);
- Average rates of transmission, peak rates of transmission;
- Timestamps (e.g. regarding the start and end of a connection)
- Transport protocol used (like TCP or UDP)
- TCP slow start reset data
- TCP connection state Information collected by endpoint agent 250 can be done in one or more particular reporting periods, e.g., hourly, daily, weekly, etc. This information can also be reported in real-time (e.g. as it is obtained or very shortly thereafter) in various embodiments. Endpoint agent 250 can also collect other system data, such as CPU usage, memory usage, etc. Data collected by endpoint agent 250 is not limited to the above.

Similarly, switch agent 280 may also collect a variety of data regarding switch 202. This data can be any of the above (listed relative to endpoint agent 250). Thus, switch agent 280 can collect data about which devices switch 202 has been in communication with, packets being dropped over particular communication links, performance of different network interfaces, etc. Switch agent 280 could collect information indicating, for example, that network interface 255 is dropping 2.2% of its packets, while network interfaces 260 and 265 are dropping only 0.1% of their packets. Such a discrepancy could indicate that network interface 255 has hardware that is in the process of failing, or that a cable connected to network interface 255 could be going bad, for example. Further, note that in some embodiments, endpoint agent 250 or switch agent 280 may be deployed on a device outside of intranet 102 (e.g., a switch within network 140 or on an external node 150).

System 200 also includes reporting system 203, which is connected to a database (DB) 204, in the embodiment of FIG. 2. Reporting system 203 is configured to collect reporting information from any number of agent programs, such as endpoint agent 250 and switch agent 280. Reporting system 203 may store this reporting information in database 204, and may perform a variety of actions using the reporting information. As discussed further below, for example, the reporting information of different systems can be analyzed from which various conclusions or inferences can be made. In some cases, reporting system 203 may discover a network anomaly or malware by analyzing reporting data.

Note that in some embodiments, some endpoint nodes may be locally unmonitored. That is, endpoint nodes on intranet 102 may not all have an endpoint agent 250 installed on them. (It is also possible to have some switches or other networking equipment that do not have a switch agent 280 or another agent installed on them). In such cases, network traffic observed (e.g., by passively sniffing) at data switches can provided helpful indications as to what devices are actually deployed and connected to a network. In some cases, the presence of an unmonitored endpoint node on intranet 102 could mean that a security breach has occurred, but in many cases, it may simply mean that a device or a new virtual machine has been deployed on the network without necessarily setting up proper monitoring. Large networks in particular may frequently change, and it may often be true that not 100% of endpoint nodes on these large networks have an endpoint agent installed on them.

Figure 3A:
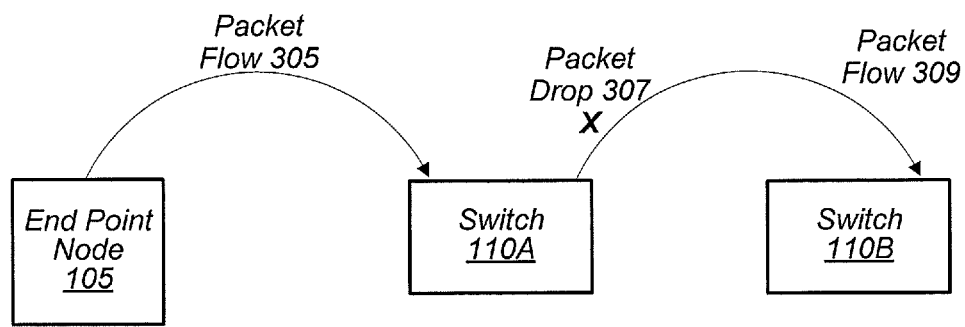
FIGS. 3A and 3B show two networking information flow diagrams in which packet loss events occur, according to some embodiments.
Figure 3B:
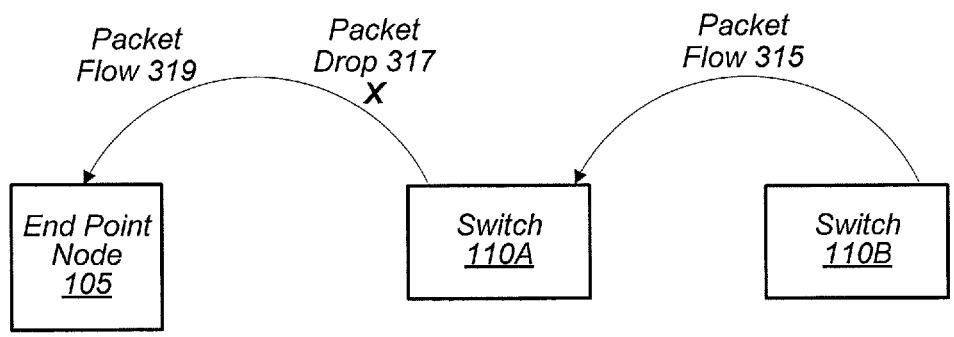

Turning to FIGS. 3A and 3B, two networking information flow diagrams are shown. In FIG. 3A, endpoint node 105 transmits packets via switch 110A and switch 110B. In this embodiment, packet flow 305 contains packets that are successfully received by switch 110A. Packet flow 309 experiences a packet drop event 307, however, and one or more packets are therefore lost. Similar operations occur in FIG. 3B relative to packet flows 315 and 319, and packet loss event 317.

In other words, traffic to or from an endpoint node 105 can go through many different network hops. Some of those network hops may operate normally, while other network hops could have communication problems. If traffic is only examined at end nodes, however, it may be difficult to determine where a network or hardware error exists. By collecting centralized reporting data, such determinations may be aided.

Figure 4:
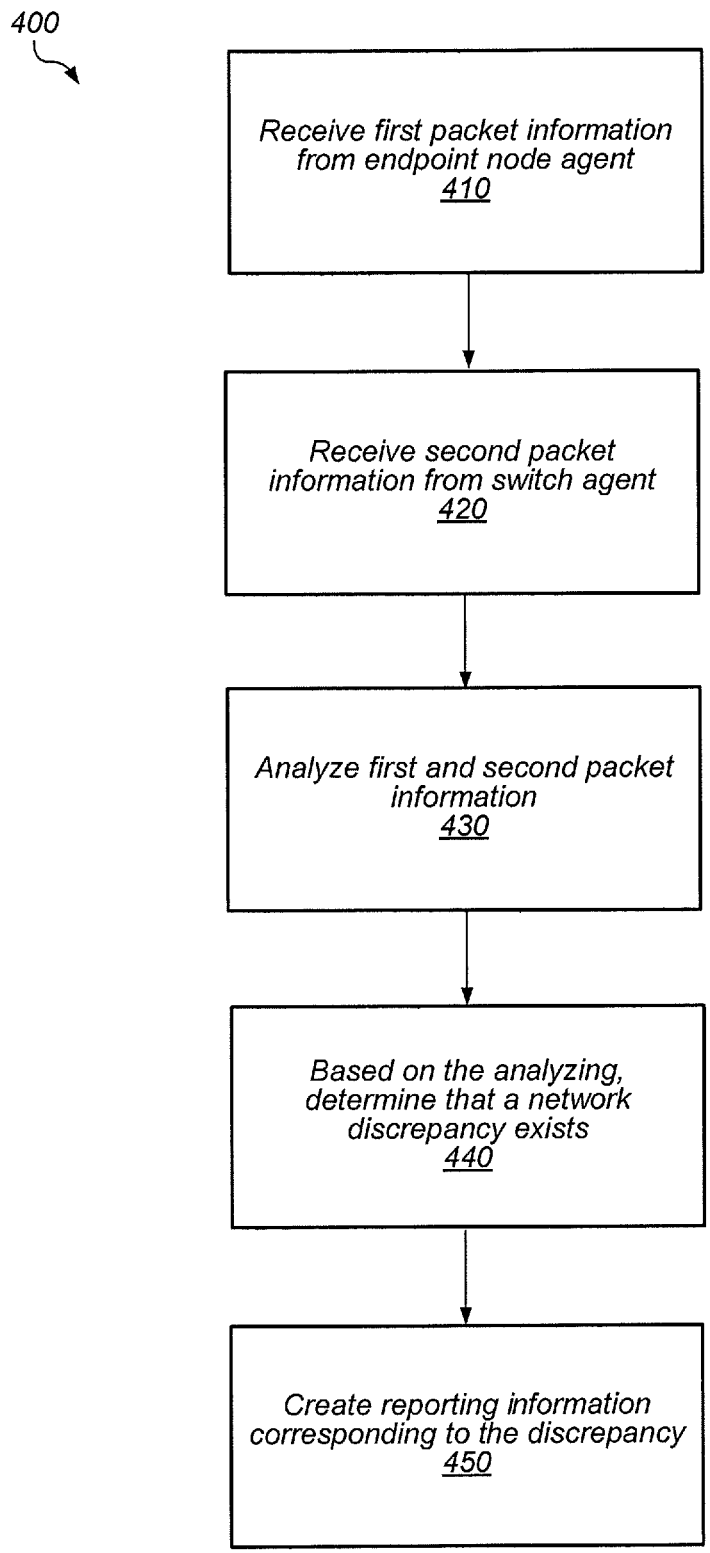
FIG. 4 illustrates a flowchart of a method that relates to determining that a network discrepancy exists, according to some embodiments.

Turning to FIG. 4, a flowchart diagram is shown of one embodiment of a method 400 that relates to determining that a network discrepancy exists. Any or all operations described in method 400 may be performed by one or more processes running on reporting system 203 in some embodiments, or one or more processes running on any suitable computer system or electronic device in other embodiments. Also, note that reporting system 203 may be an endpoint node 105 that is within intranet 102 in some embodiments, but may be an external node 150 in other embodiments. For ease of explanation, however, operations described below will simply refer to reporting system 203.

In operation 410, reporting system 203 receives first packet information from endpoint agent 250 of endpoint node 105 in one embodiment. This first packet information includes data regarding a first plurality of packets transmitted or received by endpoint node 105. This data regarding the first plurality of packets can take a number of different possible forms. In one embodiment, endpoint agent 250 records information for each of the first plurality of packets, including but not limited to destination network address, destination port number, other header information, or packet contents. In general, any aspect of network traffic information can be recorded by endpoint agent 250 and included in the first packet information. Note that the first packet information can contain information on packets received at endpoint 105 that originated from any number of different transmitting systems, as well as information on packets transmitted by endpoint 105 to any number of different destination systems. In other words, the first packet information can relate to any traffic received or transmitted by endpoint 105.

The first packet information may therefore include information gained from deep packet inspection of packet contents (as well as the second packet information or other packet information as discussed below). Deep packet inspection can include analyzing packet contents to get information about the data in the packet. In some instances, this can include performing an application layer analysis of packets, e.g., determining that a packet corresponds to an HTTP POST or HTTP GET, or any number of other application layer actions (not just limited to HTTP).

Likewise, in operation 420, reporting system receives second packet information from switch agent 280 of data switch 110 in one embodiment. This second packet information packet information includes data regarding a second plurality of packets transmitted or received by data switch 110. The type of data in the second packet information may be similar or identical to that described above relative to the first packet information. The second packet information can contain information on packets received by switch 110 that were transmitted from any number of different transmitting systems, as well as information on packets transmitted by switch 110 to any number of different next hops. In other words, the second packet information can relate to any traffic received or transmitted by switch 110.

Accordingly, the first packet information (in operation 410) and the second packet information (in operation 420) relate to two respective groups of data packets. Note that some or all of these data packets may be the very same packets, but observed at different points on intranet 102. Thus, the first plurality of data packets can be particular packets transmitted by endpoint node 105, and the second plurality of data packets can include the same particular packets as received by data switch 110. In some instances, the second plurality of data packets (at data switch 110) may represent traffic to or from a number of different endpoint nodes and/or other data switches. In other words, the first packet information may include any networking information about network activities at an endpoint node 105, while the second packet information may include any networking information about network activities at data switch 110.

Note that packet sampling may be performed by both endpoint agent 250 and switch agent 280 in various embodiments, particularly in regard to collecting information about network traffic. It may be impractical, for example, to record information about all packets sent through a network interface due to high traffic volume or other constraints (e.g., CPU, memory). Thus, only a percentage of packets may be sampled in some instances. In one embodiment, 10% of packets transmitted or received by endpoint node 105 may be monitored and used to generate the first packet information; in another embodiment, 10% of packets handled by switch 110 may be monitored and used to generate the second packet information. Note that these percentages may vary by embodiment, however, and other values (E.g., 1%, 5%, 20%, etc.) may be used.

Traffic sampling by endpoint agent 250 and switch agent 280 can further be divided into different categories, in some embodiments. For example, if an endpoint node 105 is a server providing application services (e.g. payment processing) to an external customer using external node 150, then traffic between endpoint node 105 and external node 150 may be classified as "external". Traffic between two endpoint nodes on intranet 102 may be classified as "internal", however. In this case, endpoint agent might sample 5% of traffic that is internal, and sample 5% of traffic that is external. Internal and external sampling may yield different data sets; for example, an internal connection may generally have much better availability than an external connection. Thus, a packet drop rate of 1-2% (or some other number) on an external connection might be deemed acceptable, while a packet drop rate of 1-2% on an internal connection may be considered problematic (and possibly indicative of a hardware or network configuration issue). Accordingly, a first proportion may be used to sample packets on an intranet, for example, where both ends of the connection are on the intranet, while a second proportion may be used to sample packets where at least one end of the connection is outside the intranet (e.g. an external node 150), in some embodiments. The sampling need not be symmetrical either—2% internal and 8% external sampling could be performed for example.

In operation 430, reporting system 203 analyzes the first and second packet information, in one embodiment. This analyzing may include looking at network traffic information as reported by endpoint agent 250 vs. network traffic information as reported by switch agent 280. The analyzing may include looking at reported packet header data or packet contents (deep inspection) in some instances.

In one embodiment, operation 430 includes determining, based on the first and second packet information, that at least a first packet was transmitted by endpoint node 105 but was not actually reported as being transmitted by endpoint agent 250. This scenario may occur, for example, when malware 210 has managed to circumvent detection by endpoint agent 250 and is covertly sending out network traffic.

In operation 440, based on the analyzing in operation 430, reporting system 203 determines that a network discrepancy exists involving endpoint node 105. This network discrepancy may be indicated by an inconsistency between a first group of one or more packets transmitted or received by the endpoint node and a second group of one or more packets observed by the switch agent that are destined to or transmitted from the endpoint node. The first group of packets and second group of packets may comprise all or a portion of the first plurality of data packets in operation 410, or the second plurality of data packets in operation 420. In other words, in operation 440, it may only be necessary to look at subsets of the first and second pluralities of data packets, which could correspond to a wide range of network traffic information. Determining that an inconsistency exists, however, can be done on a narrower basis in various instances.

One type of network discrepancy that can be determined is that an endpoint node 105 is transmitting unreported traffic. In one example, consider, endpoint agent 250 reporting that endpoint node 105 has sent traffic only to destinations A, B, and C on ports 80 and/or 443, but switch 110 sees endpoint node 105 transmitting traffic to destination D as well. Assuming that a reporting policy exists such that endpoint agent 250 is supposed to record all systems to which data is being transmitted, the unreported traffic to destination D is indicative of a network discrepancy. This unreported traffic, in some cases, could be evidence that malware 210 is in operation on endpoint 105. In a related example, if switch 110 sees endpoint node transmitting traffic to a reported system (destination B), but on an unreported port number (e.g., port 31337), this also may indicate a network discrepancy as malware 210 could be making an unauthorized transmission.

Dropped packet events may indicate one type of network discrepancy. In one embodiment, operation 440 therefore includes determining that at least a first packet was transmitted by endpoint node 105 but was not observed by switch 110 as being in a group of received packets. This may allow an interference to be made that the first packet was dropped.

Another type of network discrepancy that can be detected relates to a scenario which an attacker listens (e.g. from an endpoint inside an intranet) to another endpoint node. The attacker may then alter the sent data by the endpoint (e.g. for its own benefit), and then send the further along the network. This can be done by committing a MITM (Man In The Middle) attack of some type (e.g. ARP poisoning) inside the intranet. In such a case, an endpoint agent may report X data was sent, while an observing switch agent may report that X' data was observed (X'=X after attacker alters it). In this fashion, a MITM attack on the network could be detected.

In operation 450, reporting system 203 creates reporting information corresponding to the network discrepancy determined in operation 440, in one embodiment. This reporting information may be stored in database 204, and may be transmitted as an alert message to a system administrator and/or one or more other computer systems. The reporting information may contain a variety of different data (for example, data about unreported packets transmitted by endpoint node 105). The reporting information can also include other indications, such as possible causes for a network discrepancy. For example, the reporting information may indicate that unauthorized software (e.g., malware) may be executing on endpoint node 105, or may indicate that a particular piece of hardware or network link may be failing due to higher than normal error rates and/or drop rates. Reporting information can be transmitted via email, text (SMS) message, web alert, application alert, or any other suitable format.

Various further embodiments of method 400 are discussed below as they relate to particular scenarios.

Network discrepancies can be detected variously by looking at port numbers for particular packets. In one embodiment, first packet information received in operation 410 does not indicate that any packets were transmitted from a particular port number within a particular time period, but the second packet information received in operation 420 indicates that a packet was observed being transmitted from that particular port number. This may indicate, for example, that an unauthorized process is transmitting traffic while avoiding reporting via endpoint agent 250. Similarly, in another embodiment, the first packet information does not indicate that any packets, including the first packet, were transmitted with a particular port number as a destination during a time period, but the second packet information indicates that a packet was observed being transmitted to the particular port number during the time period. Thus, port numbers as a source or a destination can be leveraged to see if a device is sending potentially unauthorized traffic on a network.

In other embodiments, checking network address destinations, as observed at switch 110, vs what is being reported by endpoint agent 250 can reveal possible hidden transmission. Thus, in one instance, the first packet information in operation 410 (corresponding to endpoint agent reporting information) does not indicate that any packets are from an endpoint node and are destined to a particular network address, but the second packet information (in operation 420, corresponding to switch agent reporting information) indicates that a first packet was observed being transmitted to a particular network address from an endpoint node.

Device and OS Identification Techniques

By passively observing network traffic (e.g. at data switches), it is possible to build a network map of devices that are present on a network such as intranet 102. In various embodiments, device information and operating system information can be gathered using information provided by switch agents deployed at various data switches and/or information provided by endpoint agents deployed at various endpoint nodes.

Switch agent 280 can detect that two different network addresses both correspond to a same machine in some instances. For example, a network server (which can be an endpoint node 105) may have two or more different network interface cards (NIC). From outward appearances (e.g., observation at a switch), these two network cards may have two different network addresses and seemingly appear to be two different physical computing devices. In reality, however, the two network cards belong to the same physical server in this example.

As one example of how to determine that two network addresses belong to a same physical machine, IP identifier information can be used. In various embodiments, IP identifiers are generated by an operating system used by a server (e.g., Linux, Windows, etc.). These IP identifiers may be generated in predictable ways that correspond to a particular OS or particular version of an OS. Thus, if switch agent 280 inspects packets from two different network addresses and observes that the IP identifiers have an identifiable correlation, switch agent 280 can make a determination that the two different network addresses belong to a same physical machine, or make a determination that the two different network addresses possibly belong to a same physical machine. Reporting information indicating these determinations can also be generated by switch agent 280. In some cases, additional information can be leveraged to determine if two network addresses belong to a same physical machine—for example, it may be the case that an average packet latency from the switch to the two network addresses is substantially identical or within a predetermined range (this factor alone might not be enough, but when combined with IP identifier information could provide greater assurance). In another instance, if the two network addresses are both on a specific LAN, they may be the same physical server, but not if the two network addresses on different LANs. The above techniques are also applicable to physical machines that may have 3 or more network addresses assigned.

Operating systems of particular endpoint nodes can also be identified based on passive sniffing at a data switch (e.g. by switch agent 280) or other network location. Depending on a protocol (IP, TCP, UDP, etc.), particular header fields may be filled out in certain manners that correspond to particular operating systems and/or versions of operating systems. TTL (time to live) packet values can also be used to determine OS information. Thus, switch agent 280 can determine that a particular network address corresponds to a particular operating system.

Thus, in some embodiments, a device on a network can be fingerprinted in part by determining an operating system that is running on the device. This OS determination can also be cross-referenced to other data, such as recorded historical data relating to that device. For example, a NIC having a particular unique hardware MAC address could be observed at time T1 as being used by a Windows-based OS, and then observed at a later time T2 as being used by a Linux-based OS. Switch agent 280 (or another agent) can trigger an alert to be transmitted to a user in the event that a discrepancy is observed, such as an unexpected or unexplained change in OS or OS versions.

In one embodiment, another technique can be used to perform passive-sniffing based OS fingerprinting based on ICMP (Internet Control Message Protocol). Each OS may put a known and constant value in the payload of ICMP packets for "ping" operations (i.e. an ICMP echo request). Thus, it is possible to identify the OS of a specific host by mapping the observed payload values to known OS's. By observing values in ping requests or responses, this provides another passive fingerprinting mechanism in order to make a more accurate decision on what OS is believed to be in operation on a given endpoint node.

Services being used by particular systems can also be discovered via passive sniffing (again, e.g., at data switch 110 or other network locations). Service information can also be reported by endpoint agent 250 for systems where it is installed. Thus, services such as an HTTP server, telnet server, SSH server, payment application server, or a variety of other system and/or application services can be detected through passive sniffing. In particular, services may be discovered by analyzing port number data (what port did the packet originate on and/or what port it is destined to), as well as deep packet inspection data where payload data may be examined at the application layer. This allows a more complex network map to be built up, and can provide a better picture than merely performing active network scanning in some instances. Active scanning, for example, may not uncover certain services—especially for malware or an unauthorized service that will not necessarily respond to a port scan.

Passive sniffing, in accordance with the above, can therefore be used to discover various network devices. The techniques described herein relative to discovering devices and device characteristics can be deployed on a data switch but can also be deployed at other points within a network such as intranet 102, such as endpoint node 105, firewall 120, etc. In some cases, a separate hardware network device may be attached to a switch, endpoint node, network connection, or other equipment to discover devices and their characteristics.

Passive sniffing provides an alternative to other network techniques such as active scanning (where a system may actively query a range of IP addresses, for example, by sending out query packets and waiting for a response). Active scanning may, depending on configuration, trigger an intrusion detection system or otherwise impede network efficiency and operation, as additional data is being injected into a network. Further, services or devices that are attempting to hide from detection may be configured to simply ignore active scanning techniques. However, the traffic being sent and received by such a device can still be detected by passive sniffing.

Accordingly, unmonitored network devices can be discovered using the present techniques. When unmonitored network devices are located, various actions can be taken. A company-controlled device that was added to intranet 102 without all required monitoring software being installed, for example, can be added to a list of devices that need action to bring into compliance. If it is determined that an unmonitored device is not company controlled, this may be indicative of a major or minor security breach that should be fixed (for example, a bad actor has installed a device on the network, or a personal computing device of an employee has connected to the network in an unapproved manner). Reporting data on unmonitored devices, in accordance with the above, can be generated at reporting system 203 and sent to an administrator or other party.

In more sophisticated passive sniffing techniques, unauthorized traffic that attempts to hide itself with legitimate traffic can also be detected. For example, imagine that endpoint node 201 is transmitting encrypted packets all destined for port number 443 (HTTPS). The first endpoint node may include malware that is attempting to hide its traffic by sending output data on this port. In this scenario, endpoint agent 250 might report that, for example, 500 packets were sent out destined to port 443. Switch agent 280 running on switch 202 (which is connected to endpoint node 201), however, might report that endpoint agent 250 actually sent out 625 packets destined to port 443. Thus, the 125 extra unreported packets could represent unauthorized traffic that can be detected by passive sniffing, but not active scanning.

Network Health Monitoring and Detection

Monitoring techniques provided by endpoint agent 250 and switch agent 280 can also be used to measure and detect network health.

In one embodiment, packet loss rates between various network links can be measured and approximated based on observed data flows. Consider a data flow between an endpoint node 105 and an external node 150, for example. This data flow may have several different hops within intranet 102, as well as numerous data hops on network 140 (e.g., the Internet).

Simply measuring end-to-end packet loss may not provide a sufficient amount of data to diagnose a problem that is observed during operations. If endpoint node 105 is a payments server that processes payment applications, for example, it may not be enough to know that 40% of packets transmitted from the endpoint node 105 to external node 150 are being dropped. Rather, it may be important to know where on the network those packets are being dropped.

Assume in this example that endpoint node 105 sends 10,000 packets to external node 150 in a given time period. A first data switch 110 on the route between these nodes might, from observing traffic, see that 9,999 packets were transmitted, representing a 0.01% loss rate. The next data switch 110 on the route might see that 9,987 (of the 9,999) packets were transmitted, representing a successive 0.12% loss rate. This process can be iterated throughout the route to see where a problem might be occurring.

Continuing the above example, it may be possible to see that by the time traffic leaves intranet 102 at firewall 120 and heads out to the Internet, only 0.5% of packets have been lost (meaning that 39.5% of packets are being lost outside of intranet 102). In this case, an external factor beyond a company's immediate control could be causing the problem, and upstream entities (service providers) could be contacted to investigate.

On the other hand, continuing the above example, it may be the case that a data link between two particular data switches on intranet 102 is dropping 38.7% of the packets between two nodes. This may indicate a serious software or hardware problem that needs to be remedied by a company that controls intranet 102. Determining that such a problem exists can be done by reporting system 203, in various embodiments, by comparing reporting data that has been received from a variety of endpoint agents 250 and switch agents 280 across intranet 102.

TCP slow start data may also be monitored between different network nodes. Consider a connection between nodes A and B. In TCP, a mechanism called slow start is often used in order to help prevent network congestion. The maximum segment size (MSS) for a TCP segment may initially begin at a relatively low value for example, that is then increased until a loss is detected. A switch agent 280 present on a data switch 110 may monitor slow start resets between two network nodes (e.g. as observed by passively sniffing traffic) and collect data regarding these slow start resets. The MSS that is reached before a reset (when the MSS is reduced) can be recorded, for example, and these values can be maintained over time. Historically, for example, a particular connection between nodes A and B may see an MSS of between 64 and 128. If this MSS drops to roughly between 4 and 8 for a particular period of time, this may be strongly indicative of a hardware or software error involving node A, node B, or the network connection between them. Reporting information (e.g., as sent to reporting system 203) can help reporting system 203 make a determination about TCP slow start data, and whether it indicates a problem (outside of historical norms, or outside of predetermined limits or ranges). Such determinations can be sent to an administrator or other interested party as an alert message. Accordingly, in one embodiment of method 400, analyzing the first and second packet information (e.g. in operation 430) includes performing an analysis of TCP slow start performance for the first plurality of data packets in accordance with the above.

Troubleshooting applications using packet traces can also be performing using the techniques herein. For example, while endpoint agent 250 and switch agent 280 may be configured to sample traffic in some embodiments (e.g., 10% of network traffic), they can also be instructed (e.g., from reporting system 203) to monitor and log higher or lower percentages of certain types of packets or data. If there may be a problem between a particular external node 150 and an endpoint node 105, for example, agents on intranet 102 could be instructed to capture and log data for all packets involving those nodes within a given timeframe (e.g. using passive sniffing techniques). This can result in a data flow being logged throughout all of intranet 102, which can be used for debugging or troubleshooting purposes. If a financial transaction request fails, for example, such detailed data could help uncover the problem more quickly than only looking at server log data.

Computer-Readable Medium

Figure 5:
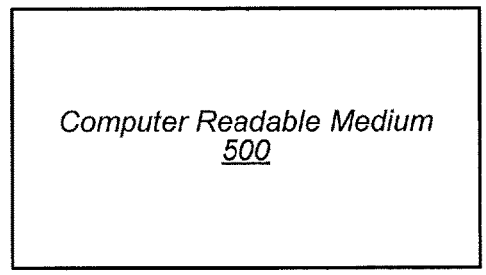
FIG. 5 is a block diagram of one embodiment of a computer readable medium.

Turning briefly to FIG. 5, a block diagram of one embodiment of a computer-readable medium 500 is shown. This computer-readable medium may store instructions corresponding to the operations of FIG. 4 and/or any techniques described herein. In various embodiments, instructions corresponding to endpoint agent 250, switch agent 280, and/or reporting system 203 may be stored on computer-readable medium 500.

Program instructions may be stored on a non-volatile medium such as a hard disk or FLASH drive, or may be stored in any other volatile or non-volatile memory medium or device as is well known, such as a ROM or RAM, or provided on any media capable of staring program code, such as a compact disk (CD) medium, DVD medium, holographic storage, networked storage, etc. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

Figure 6:
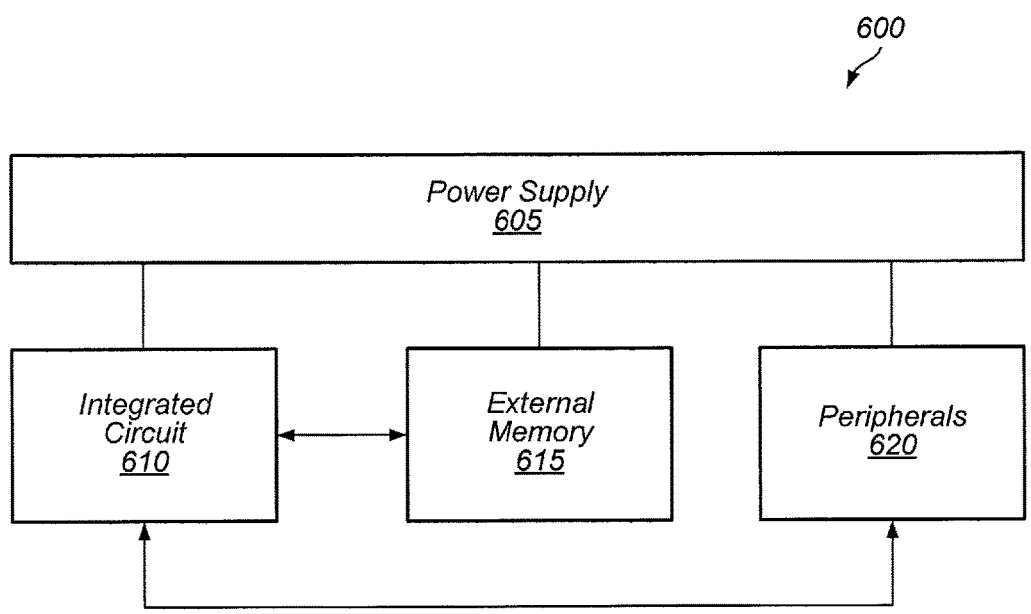
FIG. 6 is a block diagram of one embodiment of a computer system.

In FIG. 6, one embodiment of a computer system 600 is illustrated. Various embodiments of this system may be endpoint node 105, data switch 110, firewall 120, external node 150, or any other computer system as discussed above and herein. The abovementioned systems are not limited to the configuration shown in FIG. 6, however.

In the illustrated embodiment, system 600 includes at least one instance of an integrated circuit (processor) 610 coupled to an external memory 615. The external memory 615 may form a main memory subsystem in one embodiment. The integrated circuit 610 is coupled to one or more peripherals 620 and the external memory 615. A power supply 605 is also provided which supplies one or more supply voltages to the integrated circuit 610 as well as one or more supply voltages to the memory 615 and/or the peripherals 620. In some embodiments, more than one instance of the integrated circuit 610 may be included (and more than one external memory 615 may be included as well).

The memory 615 may be any type of memory, such as dynamic random access memory (DRAM), synchronous DRAM (SDRAM), double data rate (DDR, DDR2, DDR6, etc.) SDRAM (including mobile versions of the SDRAMs such as mDDR6, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 610 in a chip-on-chip configuration, a package-on-package configuration, or a multi-chip module configuration.

The peripherals 620 may include any desired circuitry, depending on the type of system 600. For example, in one embodiment, the system 600 may be a mobile device (e.g. personal digital assistant (PDA), smart phone, etc.) and the peripherals 620 may include devices for various types of wireless communication, such as wifi, Bluetooth, cellular, global positioning system, etc. Peripherals 620 may include one or more network access cards. The peripherals 620 may also include additional storage, including RAM storage, solid state storage, or disk storage. The peripherals 620 may include user interface devices such as a display screen, including touch display screens or multitouch display screens, keyboard or other input devices, microphones, speakers, etc. In other embodiments, the system 600 may be any type of computing system (e.g. desktop personal computer, server, laptop, workstation, net top etc.). Peripherals 620 may thus include any networking or communication devices necessary to interface two computer systems.

* * *

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    receiving, by a computer system from an endpoint agent corresponding to a first endpoint node on a network, first packet information regarding a first plurality of data packets transmitted by the first endpoint node during a first time period;
    generating, by the computer system, an operating system fingerprint corresponding to a first operating system of the first endpoint node based on the first packet information;
    receiving, by the computer system from a switch agent corresponding to a data switch on the network, second packet information regarding a second plurality of data packets routed through the data switch and transmitted by the first endpoint node during a second time period;
    analyzing, by the computer system, the second packet information with respect to the operating system fingerprint to determine that the second plurality of data packets is associated with a second operating system different from the first operating system;
    based on the analyzing and the second time period occurring within a threshold amount of time from the first time period, determining, by the computer system, that a network discrepancy exists involving the first endpoint node, the network discrepancy being indicated by a change in operating systems in the first endpoint node; and
    creating, by the computer system, reporting information corresponding to the network discrepancy.

2. The method of claim 1,
    wherein the network discrepancy is a first network discrepancy,
    wherein the method further comprises analyzing the first and second packet information to determine a second network discrepancy indicating that at least a first packet that was transmitted by the first endpoint node was not detected by the first endpoint agent.

3. The method of claim 1,
wherein the reporting information includes an indication, based on the determined network discrepancy, that unauthorized software may be executing on the first endpoint node.

4. The method of claim 1, wherein the network discrepancy is a first network discrepancy, and wherein the method further comprises determining a second network discrepancy involving the first endpoint node by:
receiving third packet information regarding a third plurality of data packets transmitted by the first endpoint node during the second time period;
determining that the second packet information indicates that at least a first packet was transmitted from a particular port of the first endpoint node during the second time period; and
determining that the third packet information indicates that no packets were transmitted from the particular port of the first endpoint node during the second time period.

5. The method of claim 4, further comprising determining that the first packet was transmitted to a known port number allowed as outbound traffic by a firewall of the network.

6. The method of claim 1, further comprising detecting, based on analyzing the first packet information and the second packet information, that two different network addresses correspond to the first plurality of packets and the second plurality of packets, respectively.

7. The method of claim 6, further comprising determining, based on analyzing the two different network addresses, that the two different network addresses correspond to different operating systems or different operation system versions.

8. The method of claim 1, wherein the change in operating systems comprises a change in versions of an operating system.

9. The method of claim 1, wherein the network discrepancy is a first network discrepancy, wherein the method further comprises:
deriving first packet content corresponding to a first packet transmitted by the first endpoint node based on the first packet information;
deriving second packet content corresponding to the first packet transmitted by the first endpoint node based on the second packet information; and
determining a second network discrepancy based on a difference between the first packet content and the second packet content.

10. A non-transitory machine-readable medium having stored thereon machine-readable instructions executable to cause a machine to perform operations comprising:
receiving, from an endpoint agent corresponding to a first endpoint node on a network, first packet information regarding a first plurality of data packets transmitted by the first endpoint node during a first time period;
generating an operating system fingerprint corresponding to a first operating system of the first endpoint node based on the first packet information;
receiving, from a switch agent corresponding to a data switch on the network, second packet information regarding a second plurality of data packets routed through the data switch and transmitted by the first endpoint node during a second time period;
analyzing the second packet information with respect to the operating system fingerprint to determine that the second plurality of data packets is associated with a second operating system different from the first operating system;
based on the analyzing and the second time period occurring within a threshold amount of time from the first time period, determining that a network discrepancy exists involving the first endpoint node, the network discrepancy being indicated by a change of operating systems in the first endpoint node; and
creating reporting information corresponding to the network discrepancy.

11. The non-transitory machine-readable medium of claim 10, wherein the network discrepancy is a first network discrepancy, and wherein the operations further comprise:
receiving, from the switch agent, third packet information regarding a third plurality of data packets routed through the data switch and transmitted by the first endpoint node during the first time period; and
analyzing the first and third packet information to determine a second network discrepancy indicating that at least a first packet was transmitted by the first endpoint node was not detected by the switch agent.

12. The non-transitory machine-readable medium of claim 10, wherein the operations further comprise analyzing the first and second packet information to determine that a TCP slow start performance involving the first endpoint node is below a predetermined threshold.

13. The non-transitory machine-readable medium of claim 12, wherein the analyzing of the first and second packet information provides an indication that a physical network interface of the first endpoint node is likely defective, and wherein the reporting information includes the indication.

14. The non-transitory machine-readable medium of claim 10, wherein the operations further comprise transmitting the reporting information to an administrator corresponding to the network.

15. The method non-transitory machine-readable medium of claim 10, wherein the analyzing comprises extracting a source network address associated with the second plurality of data packets, and wherein the source network address indicates a second operating system different from the first operating system.

16. A system, comprising:
a non-transitory memory; and
one or more hardware processors coupled with the non-transitory memory and configured to read instructions from the non-transitory memory to cause the system to perform operations comprising:
receiving, from an endpoint agent corresponding to the endpoint node on a network, first packet information regarding a first plurality of data packets transmitted by the first endpoint node during a first time period;
generating an operating system fingerprint corresponding to a first operating system of the first endpoint node based on the first packet information;
receiving, from a switch agent corresponding to a data switch on the network, second packet information regarding a second plurality of data packets routed through the data switch and transmitted by the first endpoint node during a second time period;
analyzing the second packet information with respect to the operating system fingerprint to determine device attributes of the first endpoint node and that the second plurality of data packets is associated with a second operating system different from the first operating system;
based on the analyzing and the second time period occurring within a threshold amount of time from the first time period, determining that a network discrepancy exists involving the first endpoint node, the network discrepancy being indicated by an inconsistency between the device attributes and the generated fingerprint and a change in operating systems in the first endpoint node; and transmitting an alert message indicative of the network discrepancy.

17. The system of claim 16, wherein the first packet information is generated by performing an application layer analysis on packet content of the first plurality of data packets.

18. The system of claim 16, wherein the operations further comprise identifying, for the first endpoint node based on analyzing the first and second packet information, a plurality of other endpoint nodes with which the first endpoint node has communicated.

19. The system of claim 16, wherein the analyzing comprises extracting a source network address associated with the second plurality of data packets, and wherein the source network address indicates a second operating system different from the first operating system.

20. The system of claim 16, wherein the second plurality of data packets comprises at least one packet having a destination address within the network and at least one packet having a destination address outside the network.

* * * * *